US008085736B2

(12) United States Patent   (10) Patent No.: US 8,085,736 B2
Ueno   (45) Date of Patent: Dec. 27, 2011

(54) CDMA RECEIVING DEVICE AND SFN DETECTING METHOD USED FOR THE SAME

(75) Inventor: Masayoshi Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 687 days.

(21) Appl. No.: 12/159,973

(22) PCT Filed: Jan. 9, 2007

(86) PCT No.: PCT/US2007/050093
§ 371 (c)(1),
(2), (4) Date: Jul. 2, 2008

(87) PCT Pub. No.: WO2007/080854
PCT Pub. Date: Jul. 19, 2007

(65) Prior Publication Data
US 2011/0058489 A1   Mar. 10, 2011

(30) Foreign Application Priority Data

Jan. 11, 2006   (JP) .................................. 2006-003121

(51) Int. Cl.
*H04Q 7/00* (2006.01)
(52) U.S. Cl. ......... 370/335; 370/342; 370/441; 370/479
(58) Field of Classification Search .................. 370/320, 370/335, 342, 441, 479
See application file for complete search history.

(56) References Cited

U.S. PATENT DOCUMENTS

| 2003/0133431 A1* | 7/2003 | Rudolf ........................... 370/342 |
| 2004/0032836 A1* | 2/2004 | Grilli et al. ..................... 370/252 |

FOREIGN PATENT DOCUMENTS

| JP | 09116483 A | 5/1997 |
| JP | 2001326606 A | 11/2001 |
| JP | 2002223179 A | 8/2002 |
| JP | 2003179954 A | 6/2003 |

OTHER PUBLICATIONS

International Search Report for PCT/JP2007/050093 mailed Feb. 6, 2007.
Motorola, "Performance Comparison of E-DPCCH Using Energy Detection vs. CRC", 3GPP RAN1 #40, R1-05-0117, Feb. 2005, pp. 1-6.
International Preliminary Report on Patentability with Written Opinion for PCT/JP2007/050093 mailed Jul. 24, 2008.

\* cited by examiner

*Primary Examiner* — Pao Sinkantarakorn

(57) ABSTRACT

A CDMA receiving device is provided which can prevent erroneous determination of an SFN detection. The CDMA receiving device (1) performs detection of a slot boundary in a slot timing detection unit (14), and performs detection of frame timing and code group in a code group identification unit (15), with regard to each slot timing detected in this way. The CDMA receiving device (1) uses a P-CPICH to detect scrambling code in a scrambling code identification unit (16) from the detected frame timing and code group. The CDMA receiving device (1) performs detection of SFN in a broadcast channel decoding unit (17) from the frame timing and the scrambling code. A P-CCPCH is used in the detection of the SFN. The SFN is included in the P-CCPCH and it is possible to detect SFN timing of a base station by decoding a BCH.

2 Claims, 6 Drawing Sheets

CDMA RECEIVING DEVICE AND SFN DETECTING METHOD USED FOR THE SAME

TECHNICAL FIELD

The present invention relates to a CDMA receiving device and SFN detecting method used for the same, and in particular, to a method of detecting SFN (System Frame Number) in the CDMA (Code Division Multiple Access) receiving device.

BACKGROUND ART

In a CDMA receiving device a cell search operation is performed for establishing synchronicity with a base station, and in order to perform a hand over, a cell search operation is constantly performed also during communication. The cell search operation includes detection of scrambling code and frame timing, and SFN detection (for example, refer to Patent Document 1).

In the SFN detection, SFN can be detected from decoded data of a broadcast channel. Determination of whether a decoded data result is correct or not is performed by a decoded CRC (Cyclic Redundancy Check) code.

In the abovementioned SFN detecting method, as shown in FIG. 6, in each frame, decoding processing is performed from physical data of 2 frames, and a CRC (Cyclic Redundancy Check) judgment is carried out.

At a point in time ((2) and (4) in FIG. 6) at which a CRC determination result at a consecutive TTI (Transmission Time Interval) is OK, an SFN is extracted from BCH (Broadcast Channel) decoded data (in this case, SFN=n+2, SFN=n+4) and a determination of an SFN detection success is made. In other words, the SFN is extracted from the BCH decoded data by a one-time CRC determination of being OK, and a determination of the SFN detection success is made.

[Patent Document 1]
JP Patent Kokai Publication No. JP-P2003-179954

DISCLOSURE OF THE INVENTION

Problems to be Solved by the Invention

The disclosed matter of the abovementioned Patent Document 1 is incorporated by reference into the present description and is to be regarded as being described in the present description. However, in the abovementioned conventional SFN detecting method, in cases in which a scrambling code is erroneously detected or cases of a bad reception environment, irrespective of the fact that an erroneous BCH decoding result is obtained, there is a possibility of CRC bit matching by chance, so that there is a problem of an SFN detection result being erroneously detected. In cases in which CRC length is 16 bits, there is a possibility of a CRC erroneous determination with a probability of 1/65536.

That is, at a location in which reception environment is bad, there are cases of erroneous detection of scrambling code or frame timing. In cases of performing decoding of a broadcast channel by erroneous scrambling code and frame timing, there are very rare cases in which CRC code is by chance OK. Furthermore, in cases of performing decoding of a broadcast channel by correct scrambling code and frame timing, even when decoded data is in error, there are cases in which the CRC code is erroneously OK.

In such cases, since a cell different to actuality is regarded as being detected, or erroneous SFN timing is notified to an upper layer, there are cases in which the CDMA receiving device operates abnormally.

Therefore, it is an object of the present invention to solve the abovementioned problems, and to provide a CDMA receiving device in which an erroneous determination of an SFN detection can be prevented, and to provide an SFN detecting method used for the same.

Means to Solve the Problems

In a first aspect of the present invention, a CDMA receiving device is provided. This CDMA receiving device is a CDMA (Code Division Multiple Access) receiving device which performs a CRC (Cyclic Redundancy Check) determination of a decoding result of a BCH (Broadcast Channel) in which broadcast information is mapped, when SFN (System Frame Number) timing of a cell, which is detected in a cell search, is detected, and is provided with measuring means which measures an electrical power value of a P-CCPCH (Primary Common Control Physical Channel) in which the BCH is mapped, and detection means which detects the SFN from the CRC determination result and a determination result of comparing a measurement result of the measuring means and a predetermined threshold.

In a second aspect of the present invention, an SFN detecting method is provided. This SFN detecting method is an SFN detecting method that is used for a CDMA (Code Division Multiple Access) receiving device which performs a CRC (Cyclic Redundancy Check) determination of a decoding result of a BCH (Broadcast Channel) in which broadcast information is mapped, when SFN (System Frame Number) timing of a cell, which is detected in a cell search, is detected, wherein the CDMA receiving device executes a measuring process which measures an electrical power value of a P-CCPCH (Primary Common Control Physical Channel) in which the BCH is mapped, and a detection process which detects the SFN from the CRC determination result and a determination result of comparing a measurement result of the measuring process and a predetermined threshold.

In order to detect a TTI (Transmission Time Interval) boundary when decoding the BCH, it is preferable to perform a decoding process from a P-CCPCH of 2 frames, for each frame, to perform the CRC determination, and to measure the electrical power of the P-CCPCH of the 2 frames.

It is preferable to perform a synchronization determination of the TTI from continuity of the SFN in the decoding result of the BCH.

It is preferable to perform a determination of continuity of the SFN in cases in which the electrical power value of the P-CCPCH does not satisfy the threshold value.

That is, the CDMA (Code Division Multiple Access) receiving device of the present invention, when detecting SFN (System Frame Number) timing of a detected cell in a cell search system in a spread spectrum communication system, is characterized by determining whether or not decoded broadcast information has reliability, using the CRC (Cyclic Redundancy Check) determination of the BCH (Broadcast Channel) in which broadcast information is mapped, and an electrical power determination of the P-CCPCH (Primary Common Control Physical Channel).

To explain more specifically, in the CDMA receiving device of the present invention, the SFN detection in a cell search operation is performed from the CRC result of the BCH and the electrical power value of the P-CCPCH. Thus, in the CDMA receiving device of the present invention, since the CRC determination and the electrical power determination are used in the SFN detection, it is possible to improve reliability of the SFN detection result.

As described above, in the CDMA receiving device of the present invention, since a determination is made using not only the CRC determination result but also the P-CCPCH electrical power, in the BCH decoding operation, it is possible to prevent an erroneous detection of SFN timing.

Furthermore, in the CDMA receiving device of the present invention, by determining not only the CRC result of the BCH when the SFN is detected, but also whether or not the electrical power value of the P-CCPCH is greater than a predetermined threshold, it is possible to prevent erroneous cell detection.

MERITORIOUS EFFECTS OF THE INVENTION

In the present invention, by the abovementioned type of configuration and operation, an effect is obtained in which it is possible to prevent erroneous detection of the SFN timing.

EXPLANATIONS OF SIGNS

Figure 1:
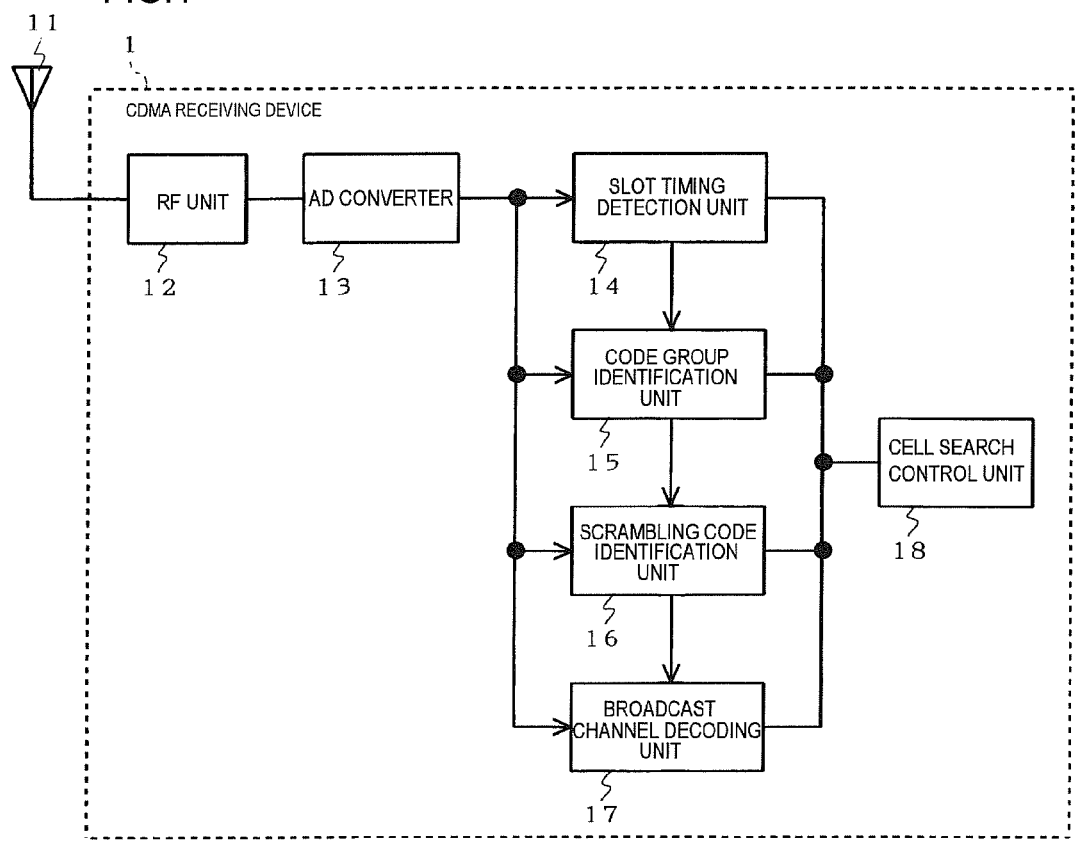
FIG. 1 is a block diagram showing a configuration of a cell search unit of a CDMA receiving device according to one exemplary embodiment of the present invention.

1 CDMA receiving device
11 antenna
12 RF unit
13 AD converter
14 slot timing detection unit
15 code group identification unit
16 scrambling code identification unit
17 broadcast channel decoding unit
18 cell search control unit
171 path search unit
172 despreading unit
173 data decoding unit
174 electrical power computation unit

PREFERRED MODES FOR CARRYING OUT THE INVENTION

Next, an exemplary embodiment of the present invention is explained making reference to the drawings. FIG. 1 is a block diagram showing a configuration of a cell search unit of a CDMA (Code Division Multiple Access) receiving device according to one exemplary embodiment of the present invention. In FIG. 1, the CDMA receiving device 1 is configured from an antenna 11, an RF (Radio Frequency) unit 12, an AD (analog-digital) converter 13, a slot-timing detection unit 14, a code group identification unit 15, a scrambling code identification unit 16, a broadcast channel decoding unit 17, and a cell search control unit 18.

The antenna 11 receives a radio wave, and the RF unit 12 converts a signal received by the antenna 11 into an IQ signal. The AD converter 13 converts the IQ signal from an analog signal to a digital IQ signal.

The slot timing detection unit 14 detects slot timing from the IQ signal that has been converted into a digital signal. The code group identification unit 15 performs identification of a code group from the IQ signal and the slot timing, and performs detection of frame timing.

The scrambling code identification unit 16 identifies scrambling code from the digital IQ signal, the code group, and the frame timing. The broadcast channel decoding unit 17 decodes a broadcast channel from the digital IQ signal, the frame timing, and the scrambling code.

The cell search control unit 18 performs a cell search operation by controlling the slot timing detection unit 14, the code group identification unit 15, the scrambling code identification unit 16, and the broadcast channel decoding unit 17.

Figure 2:
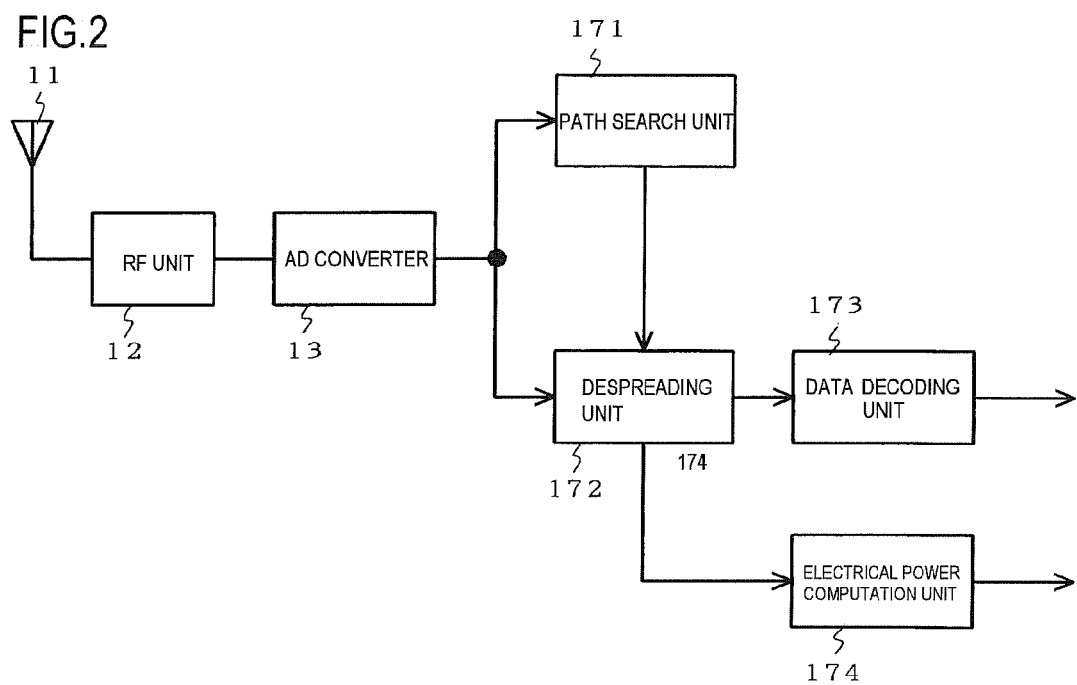
FIG. 2 is a block diagram showing an internal configuration of a broadcast channel decoding unit of FIG. 1.

FIG. 2 is a block diagram showing an internal configuration of the broadcast channel decoding unit 17 of FIG. 1. In FIG. 2 the broadcast channel decoding unit 17 is configured from a path search unit 171, a despreading unit 172, a data decoding unit 173, and an electrical power computation unit 174.

The antenna 11 receives a radio wave, and the RF unit 12 converts a signal received by the antenna 11 into an IQ signal. The AD converter 13 converts the IQ signal from an analog signal to a digital IQ signal.

The path search unit 171 detects path timing from the digital IQ signal and notifies the despreading unit 172. The despreading unit 172 despreads the digital IQ signal at the path timing, to generate P-CCPCH (Primary Common Control Physical Channel) symbol data.

The data decoding unit 173 decodes the P-CCPCH symbol data, to perform a CRC (Cyclic Redundancy Check) determination and output a CRC determination result of the decoded data. The electrical power computation unit 174 measures the electrical power of the P-CCPCH symbol data.

Figure 3:
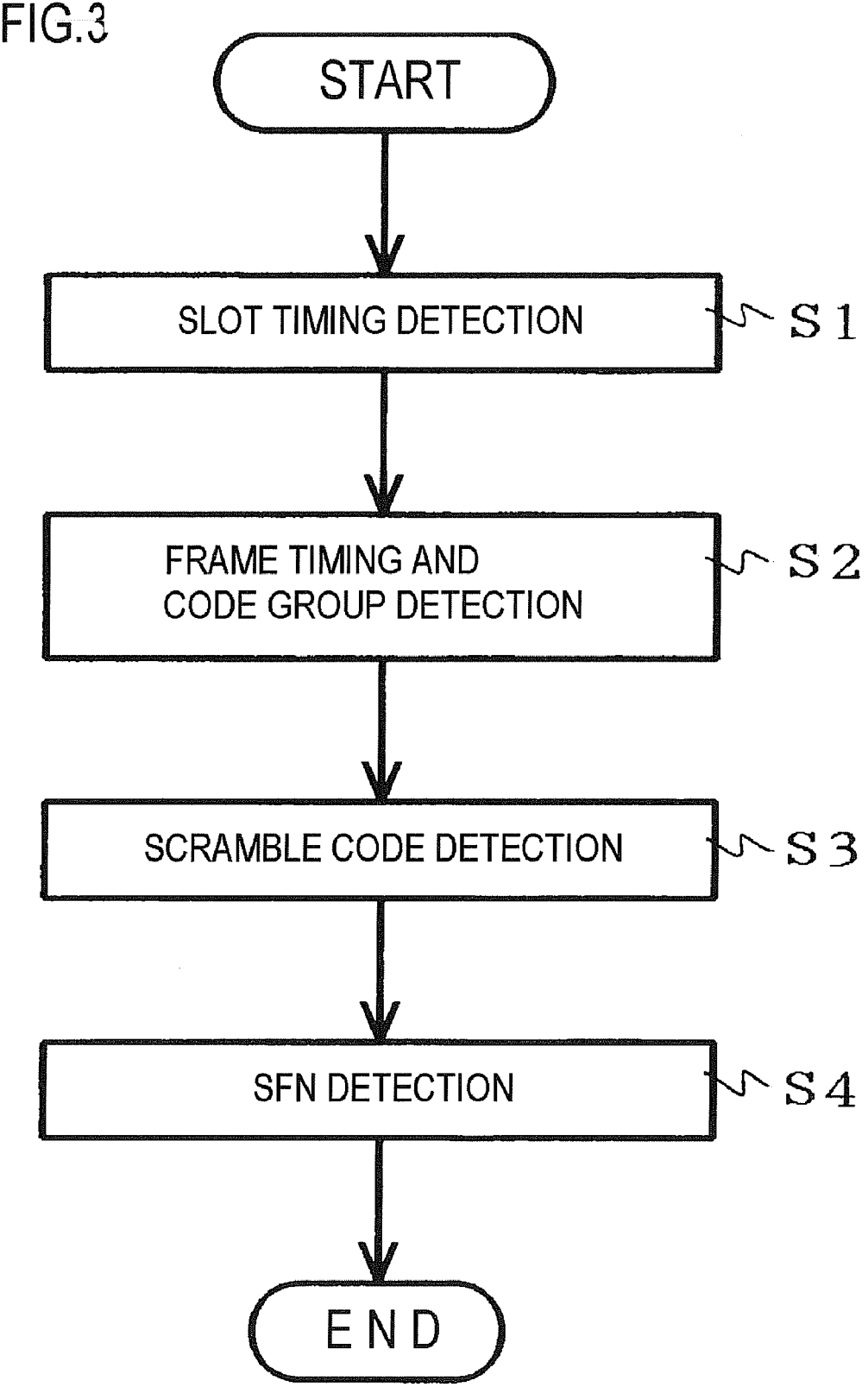
FIG. 3 is a flow chart showing an operation of a cell search unit of the CDMA receiving device according to one exemplary embodiment of the present invention.

FIG. 3 is a flow chart showing an operation of a cell search unit of the CDMA receiving device 1 according to one exemplary embodiment of the present invention. Referring to FIGS. 1 to 3, an explanation will be given concerning operation of the cell search unit and the broadcast channel decoding unit 17 of the CDMA receiving device 1.

In the CDMA receiving device 1, firstly detection of slot boundary (slot timing) is performed in the slot timing detection unit 14 (S1 in FIG. 3). P-SCH (Primary Synchronization Channel) is used in detection of this slot boundary. The P-SCH is spread by PSC (Primary Synchronization Code) spreading code common to all cells and all slots, and can detect slot timing by despreading by the PSC.

In the CDMA receiving device 1, with regard to each slot timing detected in step S1 as described above, detection of frame timing and code group by the code group identification unit 15 is performed (step S2, FIG. 3). In processing of this step S2, an S-SCH (Secondary Synchronization Channel) is used to detect the frame timing and the code group.

In the CDMA receiving device 1, a P-CPICH (Primary Common Pilot Channel) is used in the scrambling code identification unit 16 to detect scrambling code, from the frame timing and the code group detected in the processing of step 2, as described above (step S3, FIG. 3).

Next, in the CDMA receiving device 1, detection of an SFN (System Frame Number) is performed in the broadcast channel decoding unit 17 from the frame timing and the scrambling code (step S4, FIG. 3). The P-CCPCH is used in the detection of the SFN. The BCH (Broadcast Channel) is mapped in the P-CCPCH, and is used in transmission of broadcast information (system information, cell information, and the like) of a base station not shown in the drawings. Furthermore, the SFN is included in the broadcast information, and by decoding the BCH, it is possible to detect the SFN timing of the base station.

Figure 4:
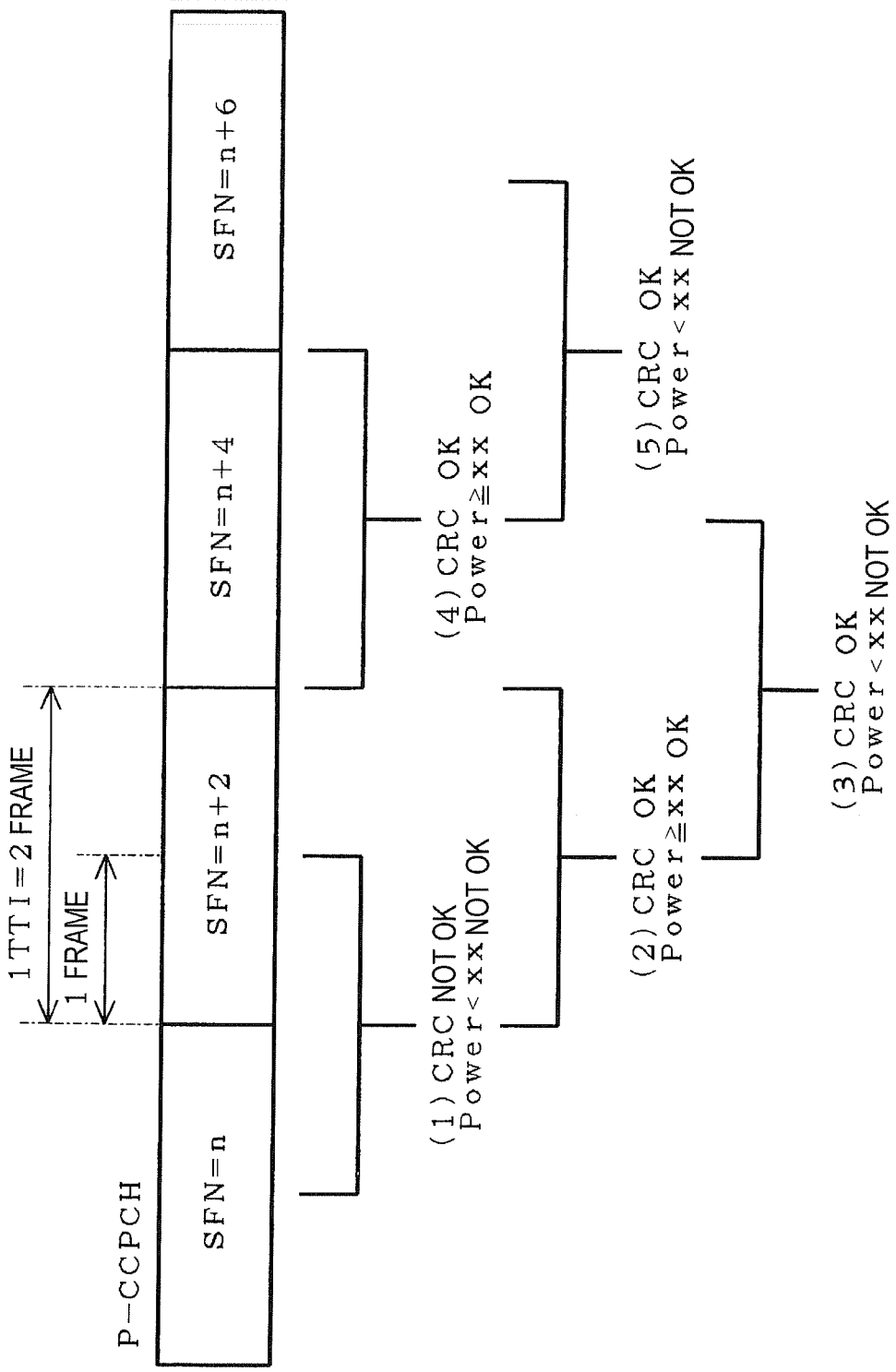
FIG. 4 is a diagram showing an SFN detecting method according to one exemplary embodiment of the present invention.

FIG. 4 is a diagram showing an SFN detecting method according to one exemplary embodiment of the present invention. In FIG. 4 a configuration of the P-CCPCH is also shown. In the P-CCPCH, due to channelization code fixing at a fixed rate, if scrambling code and frame timing are known, decoding is possible.

However, in an operation in the abovementioned step 3, since detection could only be done up to frame timing, it is necessary to detect TTI (Transmission Time Interval) boundary. In order to detect the TTI boundary, decoding processing is performed from symbol data of 2 frames, for each frame, determination of CRC is performed, and electrical power of P-CCPCH symbol data of the 2 frames is measured.

In cases in which the CRC determination is OK, and the electrical power value of the P-CCPCH symbol data is greater than or equal to a predetermined threshold (xx) (FIG. 4, (2), (4)), a determination is made that reliability of the decoded data of the 2 frames is high; the SFN (SFN=n+2, SFN=n+4) is extracted from the decoded data, and the SFN timing of the base station is detected.

In contrast to this, in cases in which the CRC determination is OK, and the electrical power value of the P-CCPCH symbol data does not exceed the threshold (xx), a determination is made that reliability of the decoded data is low, and decoding of a following frame is performed. In cases in which SFN detection has not been successful for a fixed period (FIG. 4, (1), (3)), processing of the abovementioned step S1 is redone.

In this way, in the present exemplary embodiment, in a BCH decoding operation, since a determination of the reliability of the decoded data is made not only by the CRC determination result but also by the electrical power value of the P-CCPCH symbol data, it is possible to prevent erroneous detection of the SFN timing.

Figure 5:
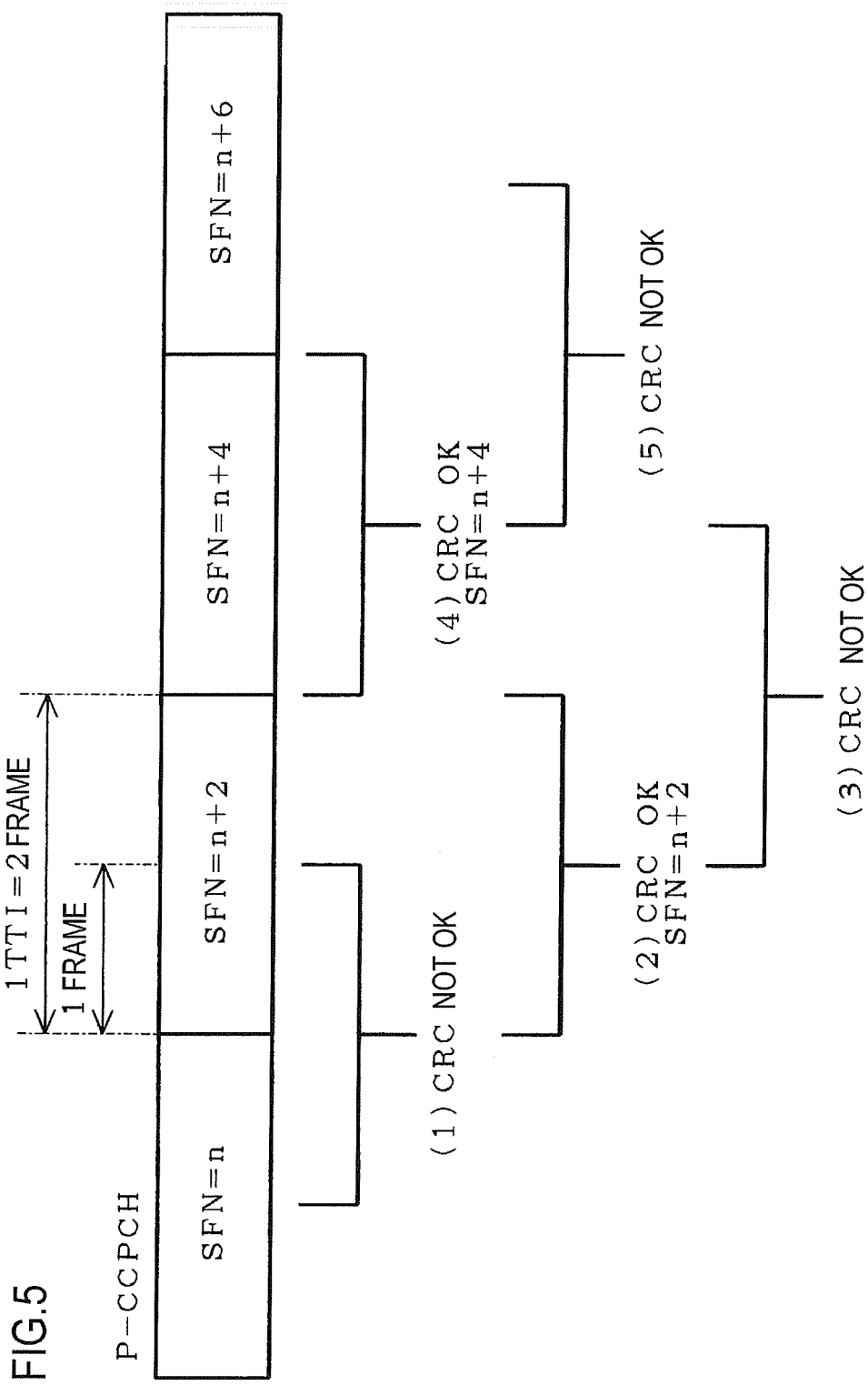
FIG. 5 is a diagram showing an SFN detecting method according to another exemplary embodiment of the present invention.
Figure 6:
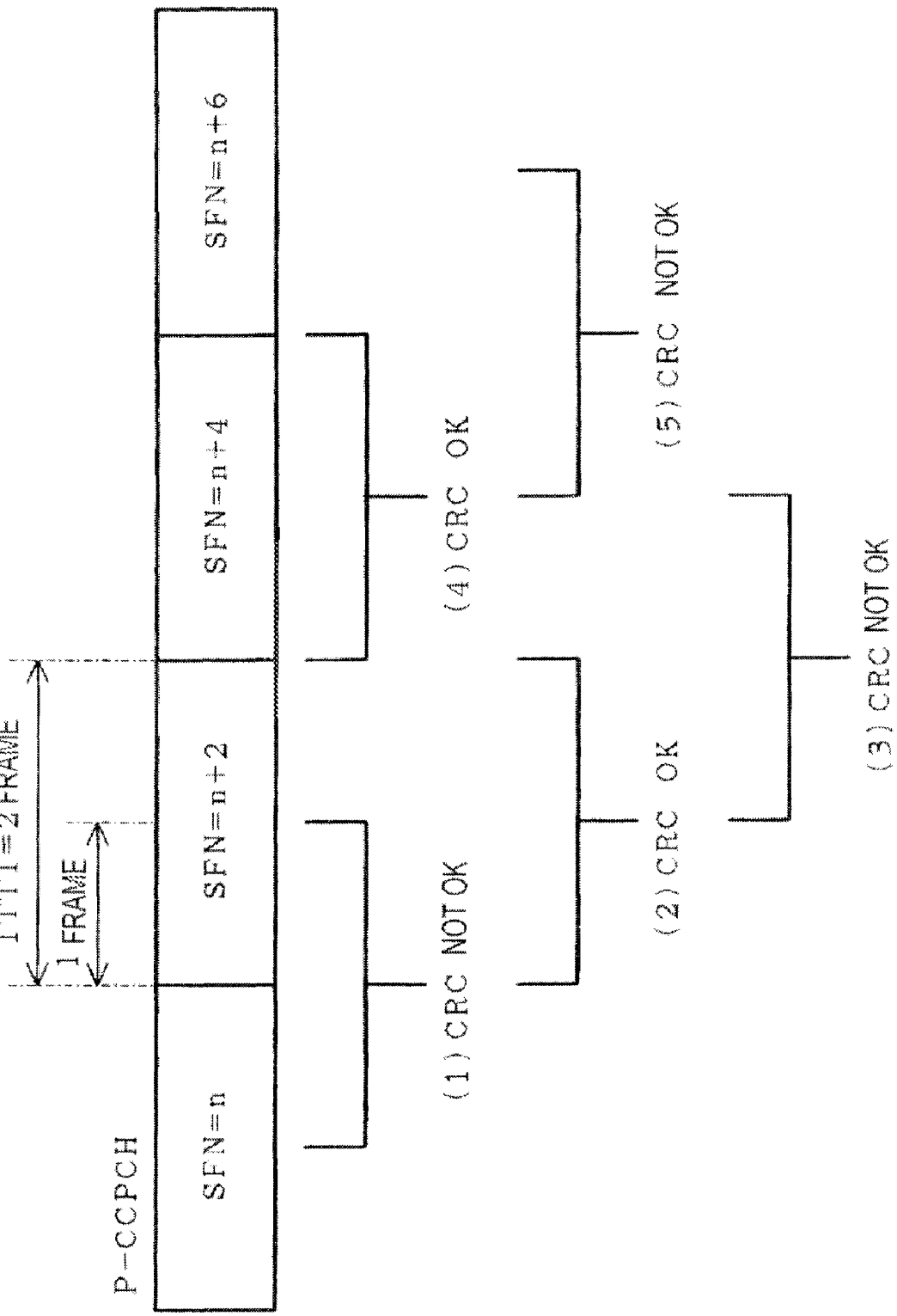
FIG. 6 is a diagram showing a conventional SFN detecting method.

FIG. 5 is a diagram showing an SFN detecting method according to another exemplary embodiment of the present invention. In the other exemplary embodiment of the present invention, the basic configuration thereof is similar to the first exemplary embodiment as described above, but a further scheme is included in the SFN detecting method. Referring to FIG. 5, an explanation will be given concerning the SFN detecting method according to this another exemplary embodiment of the present invention.

Even in cases in which the electrical power value of the P-CCPCH symbol data is below the threshold, there may be cases in which a BCH decoding result is correct. In cases in which a CRC determination is OK, and the electrical power value determination of the P-CCPCH symbol data is not OK, if a CRC determination result of a following TTI decoding is OK and an SFN value is continuous, a determination is made that the decoded data has reliability and the SFN detection is taken as succeeding.

In FIG. 5, with the CRC determination OK at (2) and (4), even if the electrical power value determination of the P-CCPCH symbol data is not OK, since the SFN value is consecutive as SFN=n+2, SFN=n+4 (in such cases, since this is for each 2 frames, there is consecutivity), a determination is made that the decoded data has reliability and the SFN detection is successful.

In this way, in the present exemplary embodiment, in cases in which the electrical power value of the P-CCPCH symbol data does not satisfy the specified threshold, since a determination of continuity of the SFN is made, with regard to plural decoding results in which the CRC determination is OK, an effect is obtained in that it is possible to prevent erroneous detection of the SFN timing.

INDUSTRIAL APPLICABILITY

The SFN detecting method of the present invention can be applied to a device which uses a reception circuit of a CDMA system, in a mobile telephone, a PC-card type wireless modem, and the like.

The invention claimed is:

1. A CDMA (Code Division Multiple Access) receiving device which performs a CRC (Cyclic Redundancy Check) determination of a decoding result of a BCH (Broadcast Channel) in which broadcast information is mapped, when SFN (System Frame Number) timing of a cell, which is detected in a cell search, is detected, characterized in that the device comprises: measuring means for measuring an electrical power value of a P-CCPCH (Primary Common Control Physical Channel) in which said BCH is mapped, and detection means for detecting the SFN from the CRC determination result and a determination result of comparing a measurement result of said measuring means and a predetermined threshold, wherein:

in order to detect a TTI (Transmission Time Interval) boundary when decoding said BCH, a decoding process is performed from a P-CCPCH of 2 frames, for each frame, said CRC determination is performed, and electrical power of said P-CCPCH of said 2 frames is measured a synchronization determination of said TTI from continuity of said SFN in said decoding result of said BCH is performed; and a determination of continuity of said SFN is performed in cases in which the electrical power value of said P-CCPCH does not satisfy said threshold value.

2. An SFN detecting method used for a CDMA (Code Division Multiple Access) receiving device which performs a CRC (Cyclic Redundancy Check) determination of a decoding result of a BCH (Broadcast Channel) in which broadcast information is mapped, when SFN (System Frame Number) timing of a cell, which is detected in a cell search, is detected, characterized in that said CDMA receiving device executes:

a measuring process which measures an electrical power value of a P-CCPCH (Primary Common Control Physical Channel) in which said BCH is mapped, and a detection process which detects said SFN from said CRC determination result and a determination result of comparing a measurement result of said measuring process and a predetermined threshold, wherein:

in order to detect a TTI (Transmission Time Interval) boundary when decoding said BCH, a decoding process is performed from a P-CCPCH of 2 frames, for each frame, said CRC determination is performed, and electrical power of said P-CCPCH of said 2 frames is measured;

a synchronization determination of said TTI from continuity of said SFN in said decoding result of said BCH is performed; and a determination of continuity of said SFN is performed in cases in which the electrical power value of said P-CCPCH does not satisfy said threshold value.

* * * * *